US008781824B2

(12) United States Patent
 Mountain

(10) Patent No.: US 8,781,824 B2
(45) Date of Patent: Jul. 15, 2014

(54) OFFLINE GENERATION OF SUBTITLES

(75) Inventor: Dale Llewelyn Mountain, Silsden (GB)

(73) Assignee: Eldon Technology Limited, Keighley (GB)

( * ) Notice: Subject to any disclaimer, the term of this patent is extended or adjusted under 35 U.S.C. 154(b) by 695 days.

(21) Appl. No.: 12/983,027

(22) Filed: Dec. 31, 2010

(65) Prior Publication Data

US 2012/0173235 A1    Jul. 5, 2012

(51) Int. Cl.
*G10L 15/00* (2013.01)
*G10L 15/26* (2006.01)
*G10L 25/00* (2013.01)

(52) U.S. Cl.
USPC ............................ 704/231; 704/235; 704/270

(58) Field of Classification Search
USPC ................... 704/231–257, 270–275; 384/239
See application file for complete search history.

(56) References Cited

U.S. PATENT DOCUMENTS

| 5,649,060 | A | 7/1997 | Ellozy et al. | |
|---|---|---|---|---|
| 6,505,153 | B1 * | 1/2003 | Van Thong et al. | 704/211 |
| 7,308,464 | B2 * | 12/2007 | Nowitz et al. | 1/1 |
| 2002/0161578 | A1 * | 10/2002 | Saindon et al. | 704/235 |
| 2004/0044532 | A1 * | 3/2004 | Karstens | 704/271 |
| 2008/0281592 | A1 * | 11/2008 | McKoen et al. | 704/235 |
| 2010/0080536 | A1 | 4/2010 | Marumori | |
| 2011/0093263 | A1 * | 4/2011 | Mowzoon | 704/235 |
| 2011/0288862 | A1 * | 11/2011 | Todic | 704/235 |
| 2012/0078626 | A1 * | 3/2012 | Tsai et al. | 704/235 |

OTHER PUBLICATIONS

European Patent Office, International Searching Authority, "International Search Report" mailed Mar. 30, 2012; International Appln. No. PCT/EP2011/074015, filed Dec. 23, 2011.
Trmal, J., et al. "Online TV Captioning of Czech Parliamentary Sessions," Text, Speech and Dialogue: 13th International Conference, TSD 2010, Brno, Czech Republic, pp. 416-422, Sep. 6, 2010.

* cited by examiner

*Primary Examiner* — Jesse Pullias
(74) *Attorney, Agent, or Firm* — Ingrassia Fisher & Lorenz, P.C.

(57) ABSTRACT

One embodiment described herein may take the form of a system or method for generating subtitles (also known as "closed captioning") of an audio component of a multimedia presentation automatically for one or more stored presentations. In general, the system or method may access one or more multimedia programs stored on a storage medium, either as an entire program or in portions. Upon retrieval, the system or method may perform an analysis of the audio component of the program and generate a subtitle text file that corresponds to the audio component. In one embodiment, the system or method may perform a speech recognition analysis on the audio component to generate the subtitle text file.

20 Claims, 5 Drawing Sheets

OFFLINE GENERATION OF SUBTITLES

TECHNICAL FIELD

Embodiments disclosed herein relate generally to multimedia content provided over a network, and more particularly to generating subtitles (or closed captioning) of an audio component of at least a portion of a stored multimedia presentation provided over the network.

BACKGROUND

Many multimedia presentations provided through a distribution system include a video and audio component. In addition, some content provided by the distribution system may include subtitles or closed captioning corresponding to the audio component that may be displayed along with the multimedia presentation. Subtitles typically display a text transcription of the audio component of the multimedia presentation as it occurs so that a hearing impaired viewer may read the dialogue of the presentation to assist in the comprehension of the presentation. In some instances, the subtitles may include additional information of the audio component of the presentation besides the dialogue, such as identity of the speakers, manner of speaking, lyrics to songs and/or ambient sounds.

For those multimedia presentations that are pre-recorded, subtitles may be generated and associated with the presentation prior to providing the presentation to a viewer through the network such that, when viewed, the subtitles may appear in synch with the video component of the presentation. For live programs, subtitles are often generated by a live operator or computer program simultaneously with the broadcast of the program through an analysis of the audio component of the presentation. However, subtitles that are generated by a live operator or computer program are often displayed with a significant lag behind the audio component of the presentation such that the subtitles often appear out of synch with the video component of the presentation. Such lag often creates frustration for hearing impaired viewers as the dialogue may not match or no longer describe what is displayed in the accompanying video component. In addition, the text of the subtitles of live programs often include significant errors due to human or computer program error during transcription, resulting in further frustration to the viewer of the subtitled presentation.

BRIEF SUMMARY

One implementation may take the form of a method for generating subtitles for a multimedia presentation. The method may include the operations of receiving, at a receiver device, a multimedia presentation from a distribution system, buffering at the receiver device, the multimedia presentation on a storage medium and retrieving at least one portion of the multimedia presentation from the storage medium, with the at least one portion comprising an audio component and a video component. The method may also include the operations of performing speech recognition analysis, at the receiver device, on the audio component to generate text corresponding to the audio component of the at least one portion of the multimedia presentation, integrating the generated text into a subtitle text file associated with the multimedia presentation and displaying the integrated multimedia presentation with the generated subtitle text file as subtitles to the presentation.

Another implementation may take the form of a receiver for a distribution system. The receiver may comprise a microprocessor and a computer readable storage medium, the computer readable storage medium storing a computer-executable code that, when executed by the microprocessor, causes the receiver to perform certain operations. These operations may include storing a received multimedia presentation, comprising a video component and an audio component on a storage medium associated with the receiver and analyzing the multimedia presentation to determine whether the multimedia presentation includes subtitles corresponding to the audio component. In addition, the operations may include retrieving at least one portion of the multimedia presentation from the storage medium if it is determined that the multimedia presentation does not include subtitles corresponding to the audio component, performing speech recognition analysis on the audio component to generate text corresponding to the audio component of the at least one portion of the multimedia presentation and integrating the generated text into a subtitle text file associated with the multimedia presentation.

Yet another implementation may take the form of a method for generating subtitles for a plurality of multimedia presentations. The method may comprise the operations of receiving a plurality of multimedia presentations from a distribution system, storing the plurality of multimedia presentations on a storage medium and retrieving at least one portion of a first multimedia presentation comprising an audio component and a video component from the storage medium. In addition, the method may include the operations of performing speech recognition analysis on the audio component to generate text corresponding to the audio component of the at least one portion of the first multimedia presentation and integrating the generated text into a subtitle text file associated with the first multimedia presentation.

DETAILED DESCRIPTION

One embodiment described herein may take the form of a system or method for generating subtitles (also known as "closed captioning") of an audio component of a multimedia presentation automatically for one or more stored presentations. In general, the system may access one or more multimedia programs stored on a storage medium, either as an entire program or in portions. Upon retrieval, the system may perform an analysis of the audio component of the program and generate a text file that corresponds to or approximates the audio component. In one embodiment, the system may perform a speech recognition analysis on the audio component to generate the text file, or subtitles, of the audio component. Upon generation, the subtitle text file corresponding with the audio component of the program may be associated with the retrieved multimedia program and stored on a storage medium for retrieval along with the associated program upon display of the program.

In one embodiment, the subtitle generation may be performed after broadcast of the program over the network but prior to access of the multimedia program by a viewer. For example, a multimedia presentation may be provided by a network and stored on a storage medium of a receiver such that the receiver may access the multimedia presentation to generate the subtitles offline prior to display of the program. In this manner, subtitles may be generated for multimedia programs that may lack subtitles when broadcast by accessing the stored presentations prior to display to the user. Thus, a hearing-impaired viewer of the program may be presented subtitles for programs that may not have included them during the original broadcast of the program. Additionally, by generating the subtitles after original broadcast of the presentation, the system may improve the effectiveness of the subtitles over those subtitles that are generated live during broadcast by removing any human-related delay of live broadcast subtitle generation. Also, accuracy of the subtitles may also be improved by performing subtitle generation offline.

Figure 1:
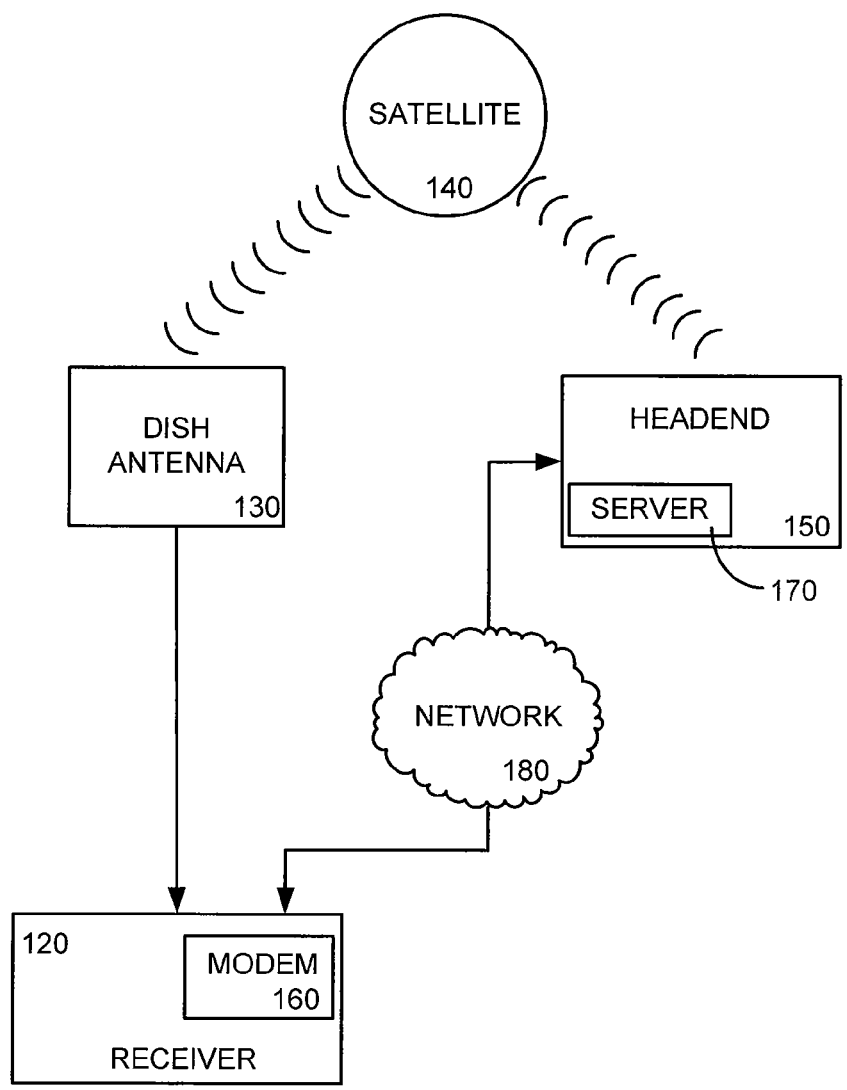
FIG. 1 depicts an exemplary satellite distribution system that may utilize a first embodiment to generate subtitles for a stored multimedia presentation prior to display of the presentation.

FIG. 1 depicts an exemplary satellite distribution system that may utilize a first embodiment of the present disclosure to generate subtitles of an audio component of a multimedia presentation for one or more stored presentations. In general, the term "subtitles" as used herein may include any text data corresponding to an audio component of a multimedia presentation and displayed on a display device, including dialogue, identities of a speaker, manner of speech, description of ambient noise, and the like. Further, while the term "subtitle" or "subtitles" is used exclusively herein, it should be appreciated that the term "subtitle" encompasses "closed captioning" of the audio component. In addition, the term "subtitle" used herein may also encompass any text translation of the audio component of the presentation displayed on the display device, such as a Spanish language text translation of an English soundtrack to the presentation. Thus, the term "subtitle" or "subtitles" may include any text data displayed on the display device as part of a multimedia presentation.

The satellite system of FIG. 1 is but one example of a system that may generate subtitles of an audio component of a multimedia presentation for one or more stored presentations. Alternatively, a digital cable system or any other system may also utilize the embodiments described herein. Further, it should be appreciated that the system may include more or fewer components than described herein and such components may be interconnected in any manner. Additionally any type of signal may be communicated by the system, such as a video signal, an audio signal, an interactive signal, other signal types and any of various combinations and/or permutations of the foregoing. In general, any distribution system that provides multimedia presentations to a user for viewing may utilize the embodiments described herein.

The system of FIG. 1 may include at least one receiver 120 configured to provide a user with an interface to the system. In general, the receiver 120 of the system may receive an encrypted signal and convert it into a signal that a display or other compatible device may recognize and manipulate in order to present the multimedia presentation to one or more users. Further, the receiver 120 may provide the converted signal to a display device, such as a television or computer screen, for display to the user. In one implementation, the receiver 120 may receive the encrypted signal from a satellite 140 or through a digital cable or network connection. Further, in the satellite and digital cable configurations, the encrypted signal may be generated by a headed 150 and transmitted to the receiver 120. Generally, the head-end 150 may be a master facility that receives programming signals for processing and distribution to various systems. In a satellite television provider, the head-end 150 may transmit the audio/visual signal to a satellite 140 for redistribution to end users, for example, subscribers to a satellite or cable television distribution system. Upon receipt, the satellite 140 may transmit the signal to an dish antenna 130 connected to the receiver 120 for decryption.

In a cable system configuration, the head-end 150 may transmit the multimedia signal directly to the receiver 120 over a cable network connection. For example, the signal may be provided to the receiver 120 through a cable connected, directly or indirectly, between the receiver 120 and the head-end 150. Alternatively, the signal may be provided over a network 180 connection, utilizing for example a modem 160 associated with the receiver 120.

Additionally, the head-end 150 may utilize the network 180 to provide other communication signals to the receiver 120. For example, the head-end 150 may utilize the network 180, the satellite 140 or other telecommunications connections to provide programming updates to the receiver 120. Similarly, the receiver 120 may communicate information to the head-end 150 or to other networked devices, for example, an instruction and information used to store information at the head-end, within the network 180 or otherwise. In one implementation, the network 180 may be the Internet such that the signals transmitted over the network may include an Internet protocol (IP) address and may take the form of standardized packets of information for proper routing. In addition, the network may include and/or utilize various communication and networking topologies such as wireless, for example, WiFi, Bluetooth, WiMax, 3G, 4G and the like, and/or wired, such as POTS, LAN, WLAN, and the like, and/or any other known or hereinafter developed method to connect to the Internet.

In one embodiment, the receiver 120 may be a set-top box ("STB") for a satellite distribution system. However, although the terms "receiver" and "satellite system," or variants thereof, are used throughout this document, it should be understood that other hardware and/or networks may be used for example, one embodiment may employ a cable box and a cable network. Accordingly, the term "receiver" is intended to encompass other similar hardware, just as networks other than satellite systems are embraced by that term or the words "distribution network."

Further, in some embodiments of the system, a digital video recorder ("DVR") may be contained within, or otherwise connected to, the receiver 120. A DVR is a device that may record video and/or audio in a digital format to a disk drive or other memory medium within the device. Through the DVR, a user may record a television program to a memory medium so that the program may be viewed by the user at a more convenient time. In some cases, the memory medium may be a hard drive or flash device that is external to the receiver but configured to receive the digital information of the recorded program.

Figure 2:
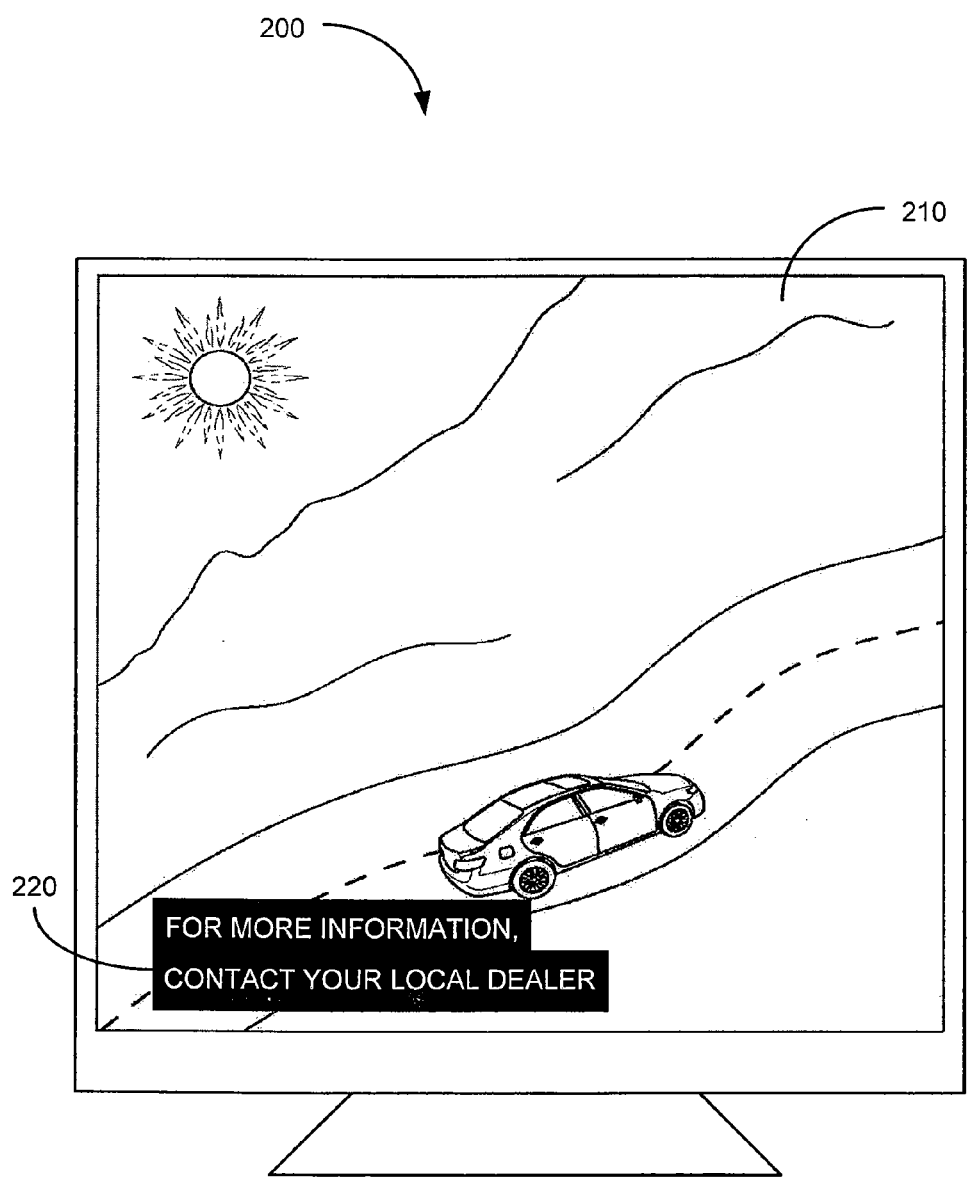
FIG. 2 is a diagram of a display device illustrating a video component of a multimedia presentation including subtitles of the audio component of the presentation.

FIG. 2 is a diagram of a display device 200 displaying a video component 210 of a multimedia presentation including subtitles 220 of the audio component of the presentation. As shown, the subtitles 220 corresponding to the audio component of the presentation may be displayed on a display device 200 simultaneously with the video component of the presentation. For pre-recorded programs, the subtitles 220 may appear on the screen at or near the same time that the corresponding audio component is provided. Thus, the displayed text may match the video component, such as matching the lip movements of a speaker or other actions displayed. In programs that contain live elements, the subtitles may appear after a delay that allows for the computer or person transcriber to enter the text in response to the audio component.

Typically, the subtitle text is encoded within the multimedia presentation signal provided over the network. For example, in television presentations, the subtitles may be encoded into the vertical blanking interval of a television signal. Upon receipt, the encoded subtitle text may be read and decoded by the receiver, similar to the decoding performed for the rest of the multimedia presentation. In addition, the subtitle text 220 may be displayed along with the video component of the program on a display device 200. Typically, subtitles may be activated and deactivated by a viewer of the program through an input device to the display or to a receiver.

Figure 3:
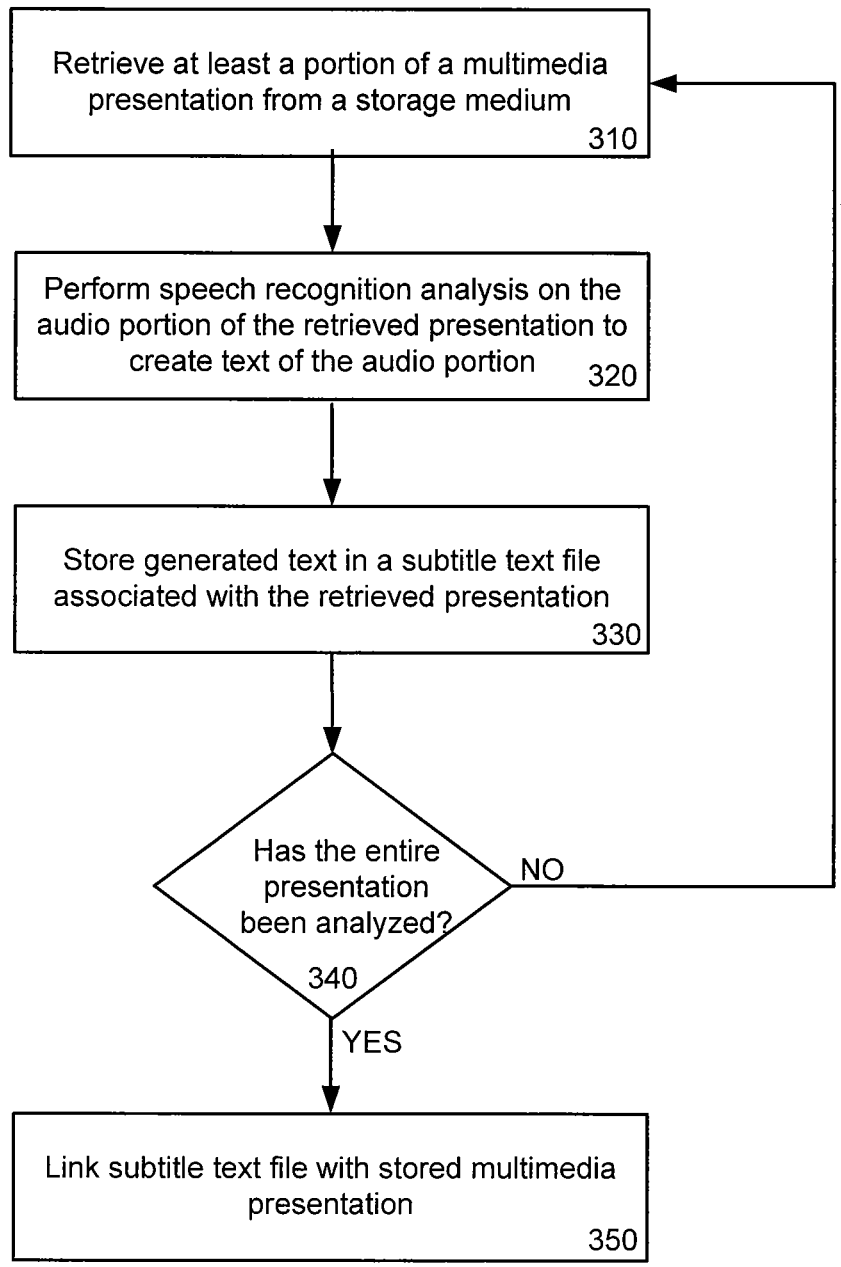
FIG. 3 is a flowchart depicting a method for a receiver to generate subtitles for one or more multimedia presentations stored on a storage medium prior to display of the presentations to a viewer.

As mentioned above, many multimedia presentations provided by a network do not include subtitles encoded within the presentation signal such that hearing impaired viewers may not be able discern or enjoy the content of the presentation. Further, subtitles for live presentations often include a delay between broadcast of the audio and generation of the corresponding subtitle. In addition, live generation of subtitles may often include several errors within the text due to limitations inherent in human and computer transcription. FIG. 3, however, is a flowchart depicting a method for a receiver to generate subtitles for one or more multimedia presentations stored on a storage medium prior to display of the presentations to a viewer. By generating subtitles for stored presentations prior to display to a viewer, the subtitles may more accurately depict the audio component of the presentation to a hearing impaired viewer.

In general, the operations of the method of FIG. 3 may be performed by a receiver of a distribution system, similar to the receiver depicted in FIG. 2. Beginning in operation 310, the receiver may retrieve at least a portion of a multimedia presentation from a storage medium. The storage medium may be any computer-readable storage medium that may store a multimedia presentation. For example, in one embodiment, the multimedia presentation may be recorded and stored by a DVR associated with the receiver. Thus, in this embodiment, one or more multimedia presentations may be received through a distribution system and stored by the DVR for later viewing by a user of the receiver. In addition, one or more of the stored presentations may not include subtitle information upon initial recording by the DVR. It should be noted, however, that the at least a portion of a multimedia presentation may be retrieved or received from any storage medium. For example, the storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing multimedia presentations.

From the storage medium, the receiver may retrieve at least a portion of a multimedia presentation stored thereon. The retrieval of the portion may occur in several ways. For example, the receiver may first determine which multimedia presentations stored on the storage medium do not include at least some subtitle information. Once identified, the receiver may retrieve at least a portion of one of the multimedia presentations to begin generating subtitle information for that portion. In one embodiment, the receiver may begin with the presentation that has been stored for the longest period of time and does not include subtitle information. In other embodiments, the receiver may select the most recent presentation that does not include subtitles, or may select a random presentation stored on the medium to begin the subtitle process. In general, the receiver may be configured to select the stored presentations for subtitle generation in any order.

In yet another embodiment, the receiver may select a multimedia presentation from the storage medium based on information about the stored presentations themselves. For example, the receiver may retrieve the presentations based on the content of the presentation, such as movies other scripted programs before stored live events, such as a recorded sporting event. In another example, movies may be selected before television shows. In general, the order in which the stored presentations are retrieved for subtitle generation may be based on any attribute of the stored presentations, including but not limited to, the type of presentation, the date of production of the presentation, the date of broadcast, the subject matter, cast and crew of the presentation, running time and so forth.

Additionally, the receiver may select a multimedia presentation from the storage medium based on information about the user of the distribution system. For example, the receiver may maintain one or more preferences for the user of the receiver and select the stored presentations based on the one or more user preferences. For example, the receiver may maintain a preference of a user of dramas over comedies. This information may be maintained or retrieved by the receiver and utilized by the receiver such that dramatic programs stored by the receiver may be selected before comedic programs. In general, any information about a user of the distribution system may be collected, stored or retrieved by the receiver and used to select multimedia programs to perform subtitle generation. In addition, the user preferences may be obtained from several sources. In one example, the user of the receiver may provide the one or more preferences to the receiver for use in determining which multimedia presentation is selected for subtitle generation. In another example, the receiver may monitor the usage of the receiver by the user and generate the one of more preferences based on the users viewing habits. In still another example, the user preferences may be stored on a network accessible by the receiver through a network connection.

As mentioned above, the receiver may retrieve the multimedia presentation from the storage medium to generate subtitles for the retrieved presentation. In one embodiment, the receiver may retrieve an entire multimedia presentation in operation 310 to generate the subtitles for that presentation. In another embodiment, the receiver may retrieve a portion of the presentation, such as the first 15 minutes of the presentation to generate the subtitles for that portion of the presentation. In general, however, any portion of a presentation may be retrieved in operation 310.

In those embodiments where a portion of the presentation is retrieved, the receiver may be further configured to analyze the stored presentation to detect those portions of the presentation that include dialogue within the presentation. For example, the receiver may analyze a stored presentation and note the portions of the presentation that include some dialogue. If the presentation does not include any dialogue (including voiceover narration), then the receiver may bypass the presentation for subtitle generation and select another stored presentation to perform the same or similar analysis. Further, once the portions of the presentation including dialogue are identified, the receiver may restrict subtitle generation to only the identified portions of the presentation. By analyzing the one or more stored multimedia presentations prior to generation of subtitles, the receiver may reduce the computation power and time required to generate the subtitles for the stored presentations.

Once the at least one portion of the multimedia presentation is retrieved from the storage medium, the receiver may perform an audio analysis on the retrieved portion to generate text corresponding to the audio component of the presentation in operation 320. For example, in one embodiment the receiver may utilize speech recognition software to analyze the audio component of the multimedia presentation and convert that speech into text. In general, speech recognition software may use one or more algorithms to analyze speech and convert that speech into an approximate text file. Thus, through the use of speech recognition analysis, the receiver may generate one or more subtitles for a multimedia presentation to be displayed along with the presentation on a display device.

In one embodiment, the speech recognition analysis may be performed by the receiver while the receiver is otherwise idle or operating in a low computational state. For example, during use of the receiver by a user, the components of the receiver may be busy performing tasks given to the receiver by the user, such as decoding of an incoming multimedia signal and providing said signal to a display device. However, during those periods where the receiver is not in use by a user, the components of the receiver may be idle. Thus, in one embodiment, the receiver may be configured to determine when the receiver is not in use and perform the speech recognition analysis of the at least one portion of the presentation during this idle time of the receiver. Therefore, as it appears to the user of the receiver, subtitles for the stored presentations may be generated without any delay or lowered performance by the receiver when in use.

Continuing to operation 330, the receiver may store the generated subtitle text into a text file that is associated with the retrieved multimedia presentation. The stored text file may maintain the text generated by the speech recognition analysis performed on the audio component of the multimedia presentation by the receiver in operation 320. In addition, the text file may also include other descriptors of the audio component of a multimedia presentation, such as identity of the speakers, manner of speaking and/or ambient sounds. In general, the subtitle text file may include any descriptor of the audio component of the corresponding multimedia presentation.

In addition to the generated text, the subtitle text file may also include information for synching the subtitles with the at least one portion of the multimedia presentation. For example, the stored multimedia presentation include one or more time stamps that define portions of the presentation so that the receiver may collect and compile the presentation in the proper order for display to a user. When generating subtitles for a portion of a presentation in operation 320, the receiver may note the time stamp for any generated subtitle and may associate said generated subtitle with the time stamp in the subtitle text file. Thus, when accessing the subtitle text file for display during display of the presentation, the time stamp information may be utilized by the receiver to synch the generated text with the time stamps embedded within the multimedia presentation such that the subtitles appear on the display device in synch with the audio component of the presentation. In general, any indicator of the relative occurrence of the subtitle text within the multimedia presentation may be maintained by the receiver to synch the generated subtitles to the presentation.

In another embodiment, the generated subtitle text file may include one or more flags that correspond to flags embedded within the multimedia presentation. During display of the presentation, the receiver may encounter a flag within the presentation, such as a bit within the pixel information of the video component of the presentation. The encountered flag may correspond or link to one or more flags stored in the related subtitle text file. Thus, the receiver may then be configured to access the text file beginning at the corresponding flag and display the stored text on the display along with the presentation. Additionally, a second flag may also be stored with the subtitle text file indicating the end of particular text block to the receiver such that the receiver may cease accessing the text file until another flag within the presentation stream is encountered. In general, any mechanism to link the generated subtitle text file with the at least one portion of the multimedia presentation may be stored along with or within the text file in operation 330.

To store the subtitle text file, the receiver may access any computer-accessible medium associated with the receiver. In one example, the text file may be stored on the same storage medium in which the multimedia presentation is stored. In another example, the text file may be stored on a separate storage medium, either within the receiver or in communication with the receiver through an I/O port. In yet another example, the text file may be stored on a network accessed by the receiver through a network connection. In addition, in the example where the text file is stored on a network, the stored text file may be accessible to any number of other receivers that are connected to the same network. Thus, several text files may be commonly shared amongst a plurality of receivers to reduce the amount of subtitle generation that each receiver need to perform.

In another example, the subtitle text file may be embedded within the stored multimedia presentation itself, such as in the vertical blanking interval of a video signal of the presentation. Once the subtitle text file is integrated into the presentation signal, the updated multimedia presentation including the generated subtitle text may be stored in a storage medium associated with the receiver, such as a DVR hard drive. Thus, when the presentation is selected to be viewed by a user, the subtitles may appear along with the video component of the presentation on the user's display.

In operation 340, the receiver may determine whether subtitles for the entire multimedia presentation have been generated. As mentioned above, the operations of 310 through 330 may be performed by the receiver on a portion of a multimedia presentation. In these embodiments, the receiver may determine whether every portion of the multimedia presentation has been analyzed and subtitles have been generated in operation 340. If there remains portions of the stored presentation that have not been analyzed and subtitles generated (for those portions of the presentation that contain dialogue), then the receiver may return to operation 310 and retrieve another portion of the presentation for analysis.

If the receiver determines that every portion of the multimedia presentation has been analyzed, or at least those portions that include dialogue within the audio component, the receiver may link or otherwise associate the generated subtitle text file with the stored multimedia presentation in operation 350. For example, as described above, the text file may include one or more flags that correspond to flags within the presentation. In another example explained above, the text file may be integrated into the presentation by the receiver in operation 350. In addition, the operations illustrated in FIG. 3 and described above may be repeated for a plurality of saved multimedia presentations. In this manner, each of the operations may be performed for each presentation stored on the storage medium so that subtitles may be generated for each stored presentation prior to display of the presentation to the user.

Figure 4:
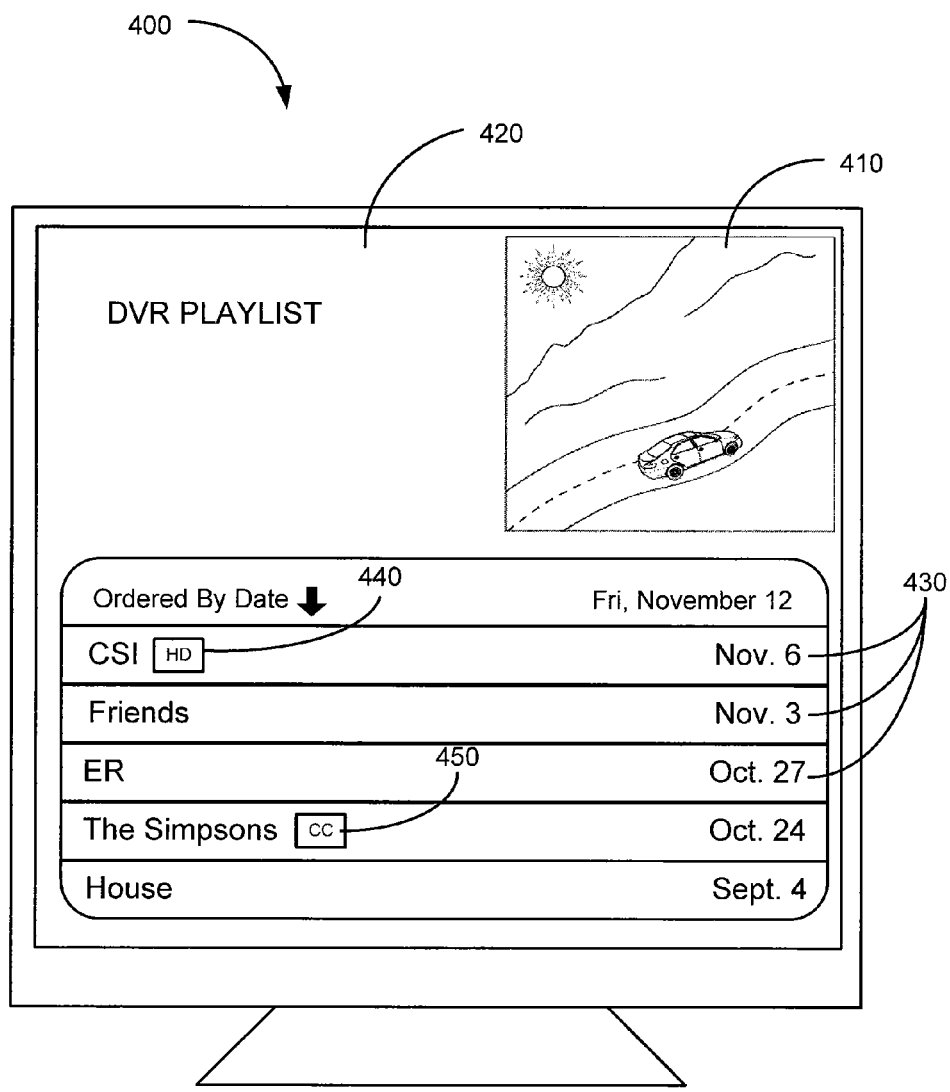
FIG. 4 is a diagram of a display device illustrating a video component of a multimedia presentation and an interface to a storage medium storing one or more presentations for which subtitles may be generated.

In one embodiment, the receiver may provide an indicator to a user of the receiver when the operations of FIG. 3 have been performed for a stored presentation. For example, FIG. 4 is a diagram of a display device 400 illustrating a video component 410 of a multimedia presentation and an interface 420 to a storage medium storing one or more presentations for which subtitles may be generated. In the interface shown in FIG. 4, one or more stored multimedia presentations may be displayed on the display device 400. To access or view a stored presentation, the user may utilize an input device, such as a remote control, to select a listed presentation. In addition, information corresponding to each stored presentation may be displayed in the interface along with the presentation name. For example, the interface 420 may include a date 430 that each presentation was stored, or whether the stored presentation is available in high definition 440.

In addition, the receiver may provide an indicator 450 to the interface 420 indicating that subtitles are available for a stored presentation upon generation of those subtitles. For example, as shown in FIG. 4, the stored program "The Simpsons" includes an indicator 450 that indicates to the user that subtitles are available for this program. This indicator may be added to the interface 420 upon generation of the subtitle text file described above with reference to FIG. 3. In one embodiment, the indicator 450 may appear upon generation of any subtitles for the program. In another embodiment, the indicator 450 may appear only after subtitles have been generated for the entire presentation.

In addition to the speech recognition analysis, several additional analysis methods may be employed by the receiver to increase the accuracy of the subtitles generated by the operations illustrated in FIG. 3. Generally, speech recognition analysis has an accuracy rate of around 80%. Many factors may affect the accuracy rate, such as computation power and sophistication of the speech recognition software. However, because the speech recognition analysis described herein is performed on a stored presentation, additional methods may be utilized in an effort to increase the accuracy of the subtitle generation.

In one embodiment the receiver may perform the speech recognition analysis multiple times for at least a portion of the presentation and compare the generated results to determine the most likely subtitle text result. In this example, the operations of FIG. 3 may be performed multiple times by the receiver, with a separate text file stored for each iteration of the analysis. After a pre-determined number of iterations of analysis, the text files may be compared and combined to find the text that occurs most frequently between the various iterations for any portion of the presentation. Alternatively, the receiver may include several processors that may each perform the speech recognition analysis on the at least one portion of the presentation and generate a subtitle text file. After completion, the generated text files from the several processors may be compared to determine the most frequently occurring text. Upon combination, the resultant text file may then be stored and associated with the presentation, as described above with reference to FIG. 3.

In another embodiment, some manner of digital signal processing may be performed on the audio component of the presentation prior to performing the speech recognition analysis. In general, the digital signal processing may be used to remove noise or other non-speech portions of the audio component of the presentation so that the speech contained within the audio component is more easily identified by the speech recognition analysis, potentially resulting in a more accurate subtitle text file generated for the audio component.

In yet another embodiment, the receiver may include speech recognition software that may learn or adapt based on previous iterations of the speech recognition analysis. For example, the receiver may perform a speech recognition analysis on a stored presentation that already includes subtitles. Upon completion of the analysis, the receiver may compare the generated subtitles to those that are included within the stored presentation. Based on this comparison, the speech recognition software resident on the receiver may alter one or more algorithms within the software to better approximate the subtitles including in the presentation. This comparison may be performed for any number of stored presentations that include subtitles to improve the accuracy of the text generated by the speech recognition analysis.

Figure 5:
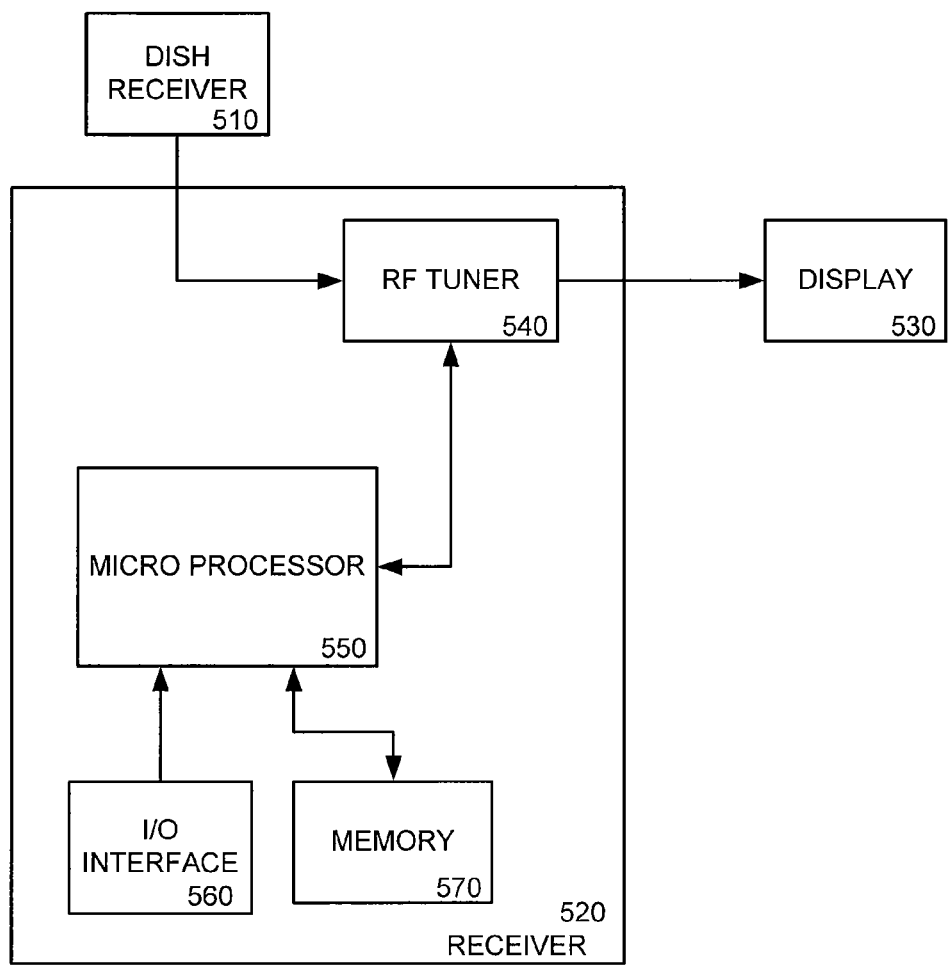
FIG. 5 is a block diagram illustrating an example of a receiver which may be used in implementing embodiments described herein.

FIG. 5 is a block diagram illustrating an example of a receiver 520 which may be used in implementing embodiments described herein. The receiver 520 may receive a transmitted multimedia signal from a satellite dish receiver 510 and may transmit a translated signal to a user's display 530 for display to the user. The multimedia signal may be received at the receiver 520 by a radio frequency (RF) tuner 540. The RF tuner 540 may translate the received signal and provide that signal to the user's display 530. Although not shown, the satellite dish receiver 510 may include a low noise block (LNB) or other components to decrypt and transmit the received multimedia signal. Similarly, the receiver 520 may include more or fewer components as those shown.

Further, the receiver 520 may include a microprocessor 550 coupled to memory 570, as described in more detail below. The receiver may also include an input/output (I/O) interface 560 to interface one or more I/O bridges or I/O devices. I/O devices may also include an input device (not shown), such as an infra-red signal provided by remote control device or alphanumeric input device, including alphanumeric and other keys for communicating information and/or command selections to the microprocessor 550. The I/O device may be utilized by a user to provide inputs and commands to the receiver 520 to control the receiver or display.

System 500 may include a dynamic storage medium, referred to as memory 570, or a random access memory (RAM) or other devices coupled to the receiver 520 for storing information and instructions to be executed by the microprocessor 550. Memory 570 also may be used for storing temporary variables or other intermediate information during execution of instructions by the microprocessor 550.

According to one embodiment, the above techniques may be performed by a receiver 520 in response to microprocessor 550 executing one or more sequences of one or more instructions contained in memory 570. These instructions may be read into memory 570 from another machine-readable medium, such as a storage medium. Execution of the sequences of instructions contained in memory 570 may cause the microprocessor 550 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as memory 570. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

It should be noted that the flowchart of FIG. 3 is illustrative only. Alternative embodiments may add operations, omit operations, or change the order of operations without affecting the spirit or scope of the present invention.

The foregoing merely illustrates certain principles and embodiments. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the embodiments and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

What is claimed is:

1. A method for generating subtitles for a multimedia presentation comprising:
   receiving, at a receiver device, a multimedia presentation from a distribution system;
   buffering, at the receiver device, the multimedia presentation on a storage medium;
   retrieving at least one portion of the multimedia presentation from the storage medium, the at least one portion comprising an audio component and a video component;
   performing speech recognition analysis, at the receiver device while the receiver device is otherwise idle, on the audio component to generate text corresponding to the audio component of the at least one portion of the multimedia presentation;
   integrating the generated text into a subtitle text file associated with the multimedia presentation; and
   displaying the integrated multimedia presentation with the generated subtitle text file as subtitles to the presentation.

2. The method of claim 1 further comprising:
   analyzing the multimedia presentation to determine whether the multimedia presentation includes subtitles corresponding to the audio component prior to performing the speech recognition analysis.

3. The method of claim 1 further comprising:
   generating one or more time indicators corresponding to time indicators included in the multimedia presentation; and
   linking the one or more time indicators to the subtitle text file to synch the generated text with the multimedia presentation.

4. The method of claim 1 further comprising:
   generating one or more flags corresponding to flags included in the multimedia presentation;
   linking the one or more flags to portions of the subtitle text file;
   analyzing the multimedia presentation for the flags included in the presentation; and
   upon encountering a flag in the presentation, accessing the portion of the subtitle text file corresponding to the encountered flag.

5. The method of claim 4 further comprising:
   communicating the multimedia presentation and the portion of the subtitle text file to a display device to display the presentation.

6. The method of claim 1 further comprising:
   storing the subtitle text file in the storage medium; and
   linking the subtitle text file to the multimedia presentation such that accessing the multimedia presentation includes accessing the subtitle text file.

7. The method of claim 1 wherein the integrating operation comprises encoding the subtitle text file into the video portion of the presentation.

8. The method of claim 1 further comprising:
   performing a plurality of iterations of the speech recognition analysis on the at least one portion of the multimedia presentation;
   maintaining the generated text from the plurality of iterations of analysis; and
   comparing the generated text from the plurality of iterations of analysis to determine a most likely generated text.

9. The method of claim 1 further comprising:
   applying a noise reducing process to the audio component prior to performing speech recognition analysis on the audio component.

10. A receiver for a distribution system comprising:
    a microprocessor; and
    a computer readable storage medium, the computer readable storage medium storing a computer-executable code that, when executed by the microprocessor, causes the receiver to perform the operations of:
      storing, at the receiver, a received multimedia presentation on a storage medium associated with the receiver, the multimedia presentation comprising a video component and an audio component;
      analyzing, at the receiver, the received multimedia presentation while it is stored on the storage medium to determine whether the multimedia presentation includes subtitles corresponding to the audio component;
      retrieving at least one portion of the multimedia presentation from the storage medium if it is determined that the multimedia presentation does not include subtitles corresponding to the audio component;
      performing speech recognition analysis, utilizing the receiver, on the audio component to generate text corresponding to the audio component of the at least one portion of the multimedia presentation while the receiver is otherwise idle;
      integrating the generated text into a subtitle text file associated with the multimedia presentation; and
      after the speech recognition analysis is complete, transmitting the integrated multimedia presentation and subtitle text file to a display device for display of the presentation with subtitles.

11. The receiver of claim 10 further comprising:
    an input/output interface configured to receive the multimedia presentation from a distribution system.

12. The receiver of claim 10 further comprising:
    a display interface, the display interface configured to communicate with the display device and wherein the computer-executable code further causes the receiver to perform the operation of:

utilizing the display interface to communicate the multimedia presentation and subtitle text file to the display device for display.

13. The receiver of claim 10 further comprising:
a network interface in communication with a network, wherein the computer-executable code further causes the receiver to perform the operation of:
communicating the subtitle text file to the network though the network interface for storage on the network.

14. The receiver of claim 13 wherein the computer-executable code further causes the receiver to perform the operations of:
storing the subtitle text file in the storage medium; and
linking the subtitle text file to the multimedia presentation such that accessing the multimedia presentation includes accessing the subtitle text file.

15. A method for generating subtitles for a plurality of multimedia presentations, the method comprising:
receiving at a receiver device a plurality of multimedia presentations from a distribution system;
storing the plurality of multimedia presentations on a storage medium;
retrieving to the receiver device at least one portion of a first multimedia presentation from the storage medium, the at least one portion comprising an audio component and a video component;
performing speech recognition analysis, utilizing the receiving device, on the audio component to generate text corresponding to the audio component of the at least one portion of the first multimedia presentation, wherein the speech recognition analysis is performed while the receiving device is otherwise idle;
integrating the generated text into a subtitle text file associated with the first multimedia presentation;
receiving a request, at the receiver device, for playback of the first multimedia presentation from the storage medium; and
displaying the integrated multimedia presentation with the generated subtitle text file as subtitles to the presentation during playback.

16. The method of claim 15 further comprising:
retrieving at least one portion of a second multimedia presentation from the storage medium, the at least one portion of the second multimedia presentation comprising an audio component and a video component;
performing speech recognition analysis on the audio component of the at least one portion of the second multimedia presentation to generate text corresponding to the audio component of the at least one portion; and
integrating the generated text into a subtitle text file associated with the second multimedia presentation.

17. The method of claim 15 wherein the at least one portion of the first multimedia presentation is retrieved at least partially based on the date the first multimedia presentation was stored.

18. The method of claim 15 wherein the at least one portion of the first multimedia presentation is retrieved at least partially based on the content of the first multimedia presentation.

19. The method of claim 15 wherein the at least one portion of the first multimedia presentation is retrieved at least partially based on a preference of a user to a receiver of a distribution system.

20. The method of claim 15 further comprising:
communicating the first multimedia presentation and the subtitle text file associated with the first multimedia presentation to a display device upon receipt of an input from a user to a receiver of a distribution system.

* * * * *